United States Patent

Pattok et al.

[11] Patent Number: 6,166,502
[45] Date of Patent: Dec. 26, 2000

[54] THERMAL CURRENT LIMITING APPARATUS AND METHOD FOR VEHICLE SYSTEM WITH ELECTRIC MOTOR ACTUATOR

[75] Inventors: Kathryn Lynn Pattok, Wiesbaden, Germany; Steven James Collier-Hallman, Frankenmuth, Mich.; Ashok Chandy, Fenton, Mich.; Julie Ann Kleinau, Bay City, Mich.

[73] Assignee: Delphi Technologies, Inc., Troy, Mich.

[21] Appl. No.: 09/329,874

[22] Filed: Jun. 11, 1999

Related U.S. Application Data

[63] Continuation-in-part of application No. 09/283,056, Apr. 1, 1999, abandoned.

[51] Int. Cl.$^7$ ............................................... H02K 17/32
[52] U.S. Cl. ........................ 318/434; 318/430; 318/432; 318/433
[58] Field of Search .................... 318/430, 432, 318/434, 433

[56] References Cited

U.S. PATENT DOCUMENTS

| | | | |
|---|---|---|---|
| 4,535,378 | 8/1985 | Endo | 361/18 |
| 4,937,719 | 6/1990 | Yamada et al. | 363/39 |
| 5,869,752 | 2/1999 | Klauber et al. | |

*Primary Examiner*—Karen Masih
*Attorney, Agent, or Firm*—Edmund P. Anderson

[57] ABSTRACT

An electric motor actuator used in an environment of varying loads for varying time periods is efficiently designed to a predetermined specification in terms of both motor load and time and operated up to but not exceeding this specification over the full expected operating range. A motor load signal is low pass filtered with a plurality of time constants spanning a range of expected motor operation to generate a plurality of filtered motor load signals each associated with one of the time constants. Each of these filtered motor load signals is compared with a predetermined reference value corresponding to the associated time constant. If one or more of the filtered motor load signals exceeds the predetermined reference value with which it is compared, the one that so exceeds by the greatest margin is selected. A command current limit factor is derived from the selected filtered motor load signal and used to limit the commanded motor current. The motor load signal preferably indicates motor operating current and may be derived from a motor current sensor or from the limited command current signal, motor speed and operating voltage to compensate for a decrease of current with motor speed due to inductance/slope compensation and voltage limit effects.

8 Claims, 6 Drawing Sheets

| LINE | DUTY CYCLE (%) | APPLY TIME (SEC) | OFF TIME (SEC) |
|---|---|---|---|
| 12 | 100 | 12 | 288 |
| 14 | 80 | 19 | 281 |
| 16 | 60 | 33 | 267 |
| 18 | 40 | 75 | 225 |
| 20 | 30 | 133 | 167 |
| 22 | 20 | CONT | NA |

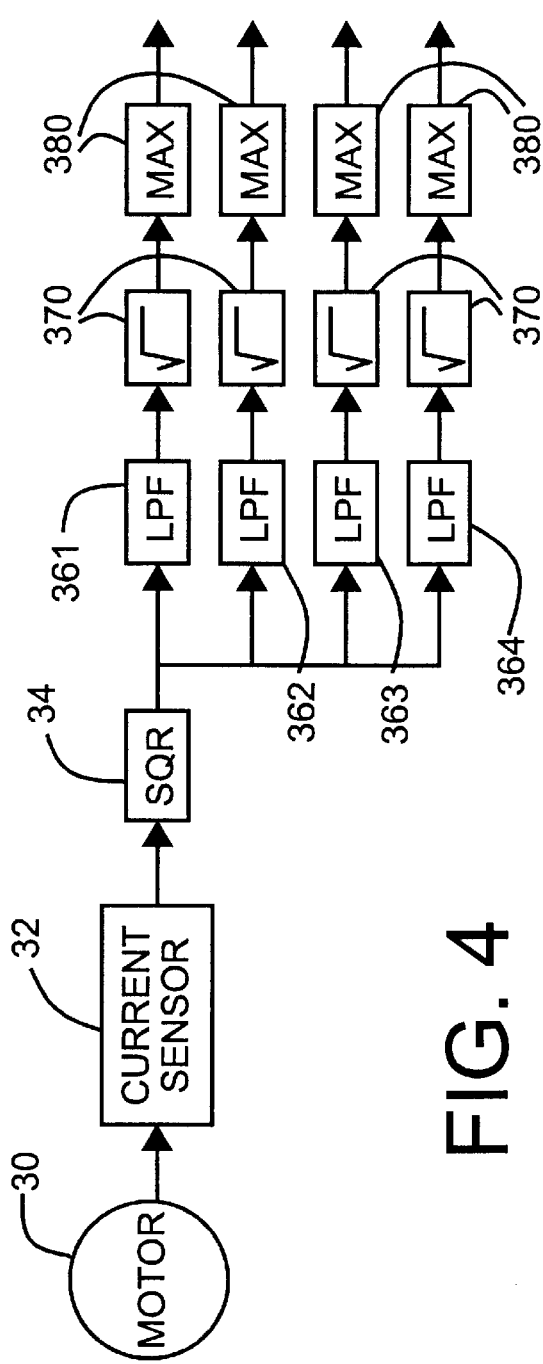
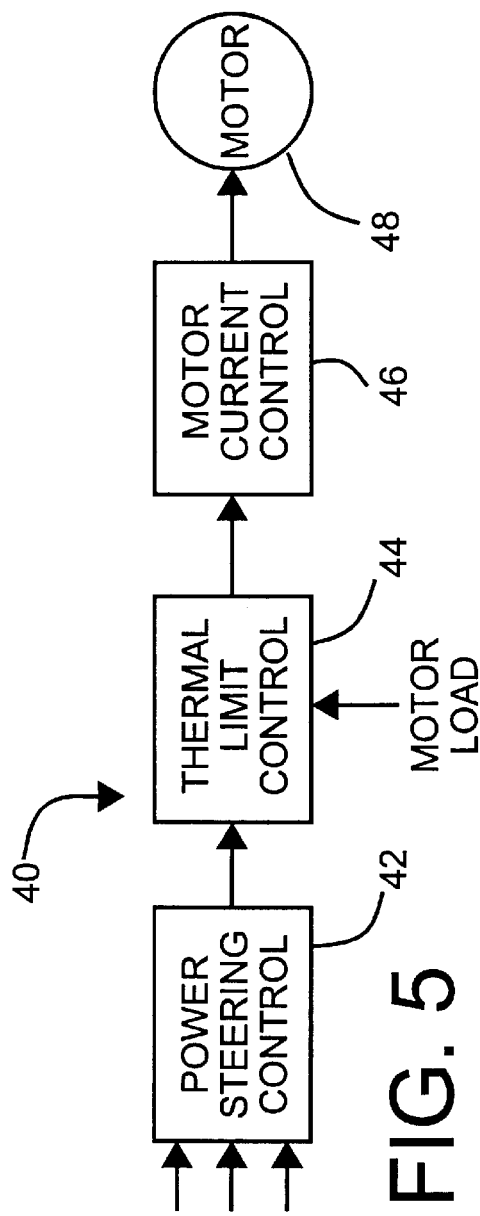
FIG. 4
FIG. 5

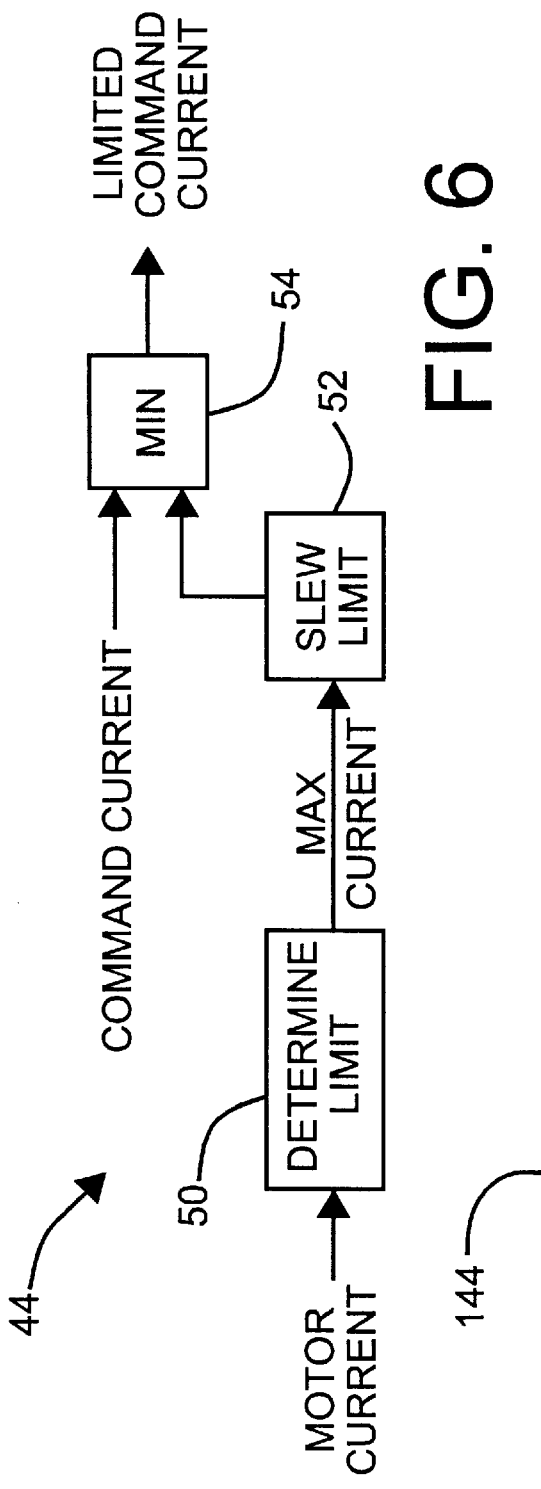
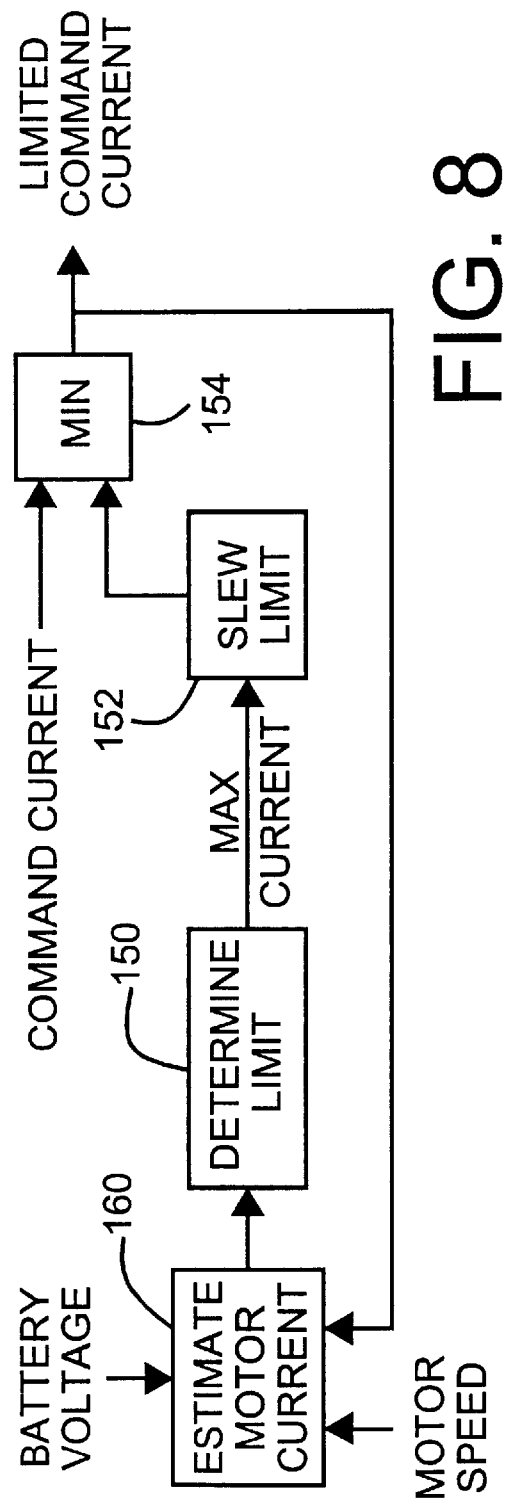

THERMAL CURRENT LIMITING APPARATUS AND METHOD FOR VEHICLE SYSTEM WITH ELECTRIC MOTOR ACTUATOR

This is a Continuation-in-Part of U.S. Ser. No. 09/283,056, filed Apr. 1, 1999 now abandoned.

TECHNICAL FIELD

The technical field of this invention is the control of vehicle systems having electric motor actuators, and particularly the limitation of electric motor current to prevent thermal overload.

BACKGROUND OF THE INVENTION

Electric motor actuators and their control circuits and devices produce heat that increases with their operating current, and they must thus be designed to operate within limits to prevent their being harmed by thermal overload. In the case of such electric motor actuators operating at substantially constant loads, this is a relatively straightforward task well known in the prior art. But many such electric motor actuators, particularly those used in vehicle systems, are subject to a wide range of loads for highly varying periods of time. For example, the electric actuating motor in a vehicle electric power steering system may require only 15 amps current for long periods of time but may require 75 amps current for shorter periods such as 5 seconds. A standard protection method for such a motor limits a motor control parameter such as motor operating current to the highest expected value (75 amps in the example). But, in the absence of a time specification, this requires the motor and control circuit to be designed to accommodate such loads for an indefinite time. Such a motor and control circuit is greatly over-designed for normal use and thus unacceptably expensive for a highly competitive market. It is also known to use thermal sensors such as thermistors to directly measure temperature in a current limiting system, but such sensors tend to be slow in response and difficult to place accurately.

SUMMARY OF THE INVENTION

The method and apparatus of this invention permit an electric motor actuator to be efficiently designed to a predetermined specification in terms of both motor load and time and operated up to but not exceeding this specification over the full expected range of varying loads and times. In this method and apparatus a motor load signal is low pass filtered with a plurality of time constants spanning a range of expected motor operation to generate a plurality of filtered motor load signals each associated with one of the time constants. Each of these filtered motor load signals is compared with a predetermined reference value corresponding to the associated time constant; and, if one or more of the filtered motor load signals exceeds the predetermined reference value with which it is compared, the one that exceeds by the greatest margin is selected. A command current limit factor is derived from the selected filtered motor load signal and used to limit the commanded motor current. The motor load signal preferably indicates motor operating current and may be derived from a motor current sensor or from the limited command current signal, motor speed and operating voltage to compensate for a decrease of current with motor speed due to inductance/slope compensation and voltage limit effects.

BRIEF DESCRIPTION OF THE DRAWINGS

FIG. 4 shows apparatus for use in deriving a specification such as that shown in FIG. 2.

FIG. 5 shows an electric motor actuated system with a thermal limit control according to the invention.

FIG. 6 shows an embodiment of a thermal limit control for use in the system of FIG. 5.

FIG. 8 shows an alternative embodiment of a thermal limit control for use in the system of FIG. 5.

DESCRIPTION OF THE PREFERRED EMBODIMENT

Figure 1:
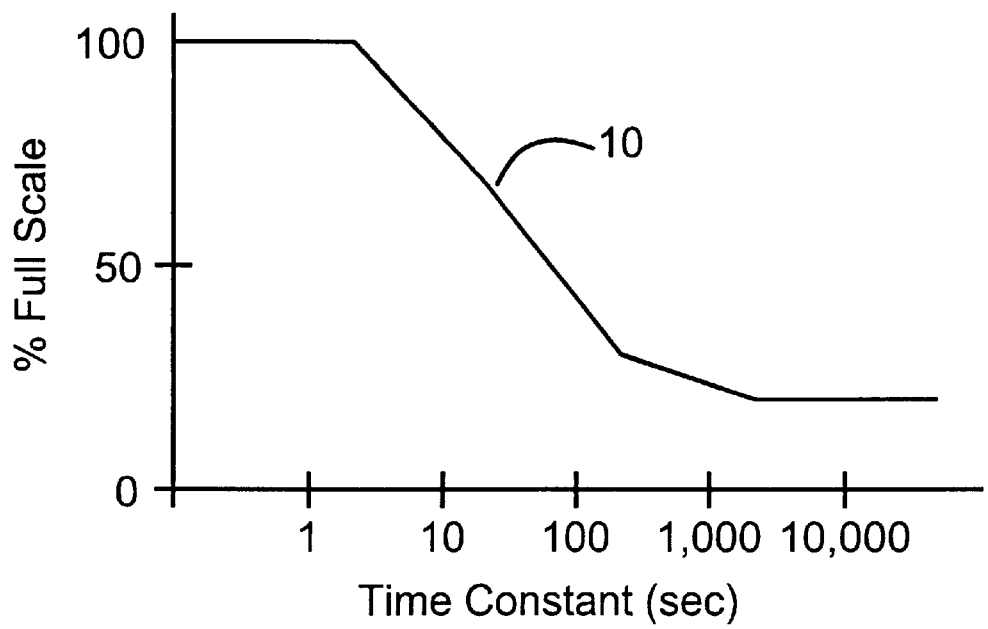
FIG. 1 shows a specification for the thermal duty cycle of an electric motor actuator, specifically an electric power steering motor, in the form of a plot of percent full load as a function of time constant in seconds.

An apparatus for generating a specification for an electric motor actuator (including controller, gearbox, etc.) used in, for example, a motor vehicle system, is shown in FIG. 4. A motor actuator 30 is assembled in the vehicle system and subjected to a variety of vehicle actions or maneuvers designed to simulate the full expected range of the system in the vehicle. For example, the system may be an electric power steering system, and the actions and maneuvers may include many examples of vehicle steering maneuvers, by different drivers and including worst case examples in terms of thermal loading on the electric motor actuator. Motor actuator 30 is preferably over-designed for the system so as to survive the most extreme demands of the test. A current sensor 32 provides a signal of motor load, which is squared in this embodiment in a square block 34, since heat is generated as the square of motor load in the motor and controller. The squared signal is separately filtered by each of a series of first order low pass filters 361–364 having progressively longer time constants, which are chosen to span a possible range of time durations of the vehicle actions or maneuvers of the test, with specific attention to the thermal time constants of the main system components. For example, the time constants of filters 361–364 may be 1.59, 15.9, 159 and 1590 seconds, respectively. The outputs of the filters are processed by square root blocks 370, the outputs of which are monitored for the duration of the test by maximum value blocks 380, each of which stores the maximum value attained throughout the test by its monitored filter output. These stored values are then used to construct the specification to which a production electric motor actuator is designed. The apparatus and method of this invention is used to ensure that the specification values are not exceeded during operation of the motor actuator in its environment.

The result of the tests described above may be represented as a thermal motor duty cycle specification, in graphical form, as shown in FIG. 1. The specification is presented in terms of load and time in the form of curve 10, which presents percent of full load as a function of time constant in seconds. Curve 10 may be interpreted as showing, for any given time constant, the maximum percent of full load allowed for the motor actuator. Thus, if a steering maneuver lasts for a predetermined number of seconds or less, full load is permitted by the motor actuator for that maneuver, with progressively lower percentages of full load for progressively longer time durations. Twenty percent of full load is permitted continuously for an indefinite period.

Figure 2:
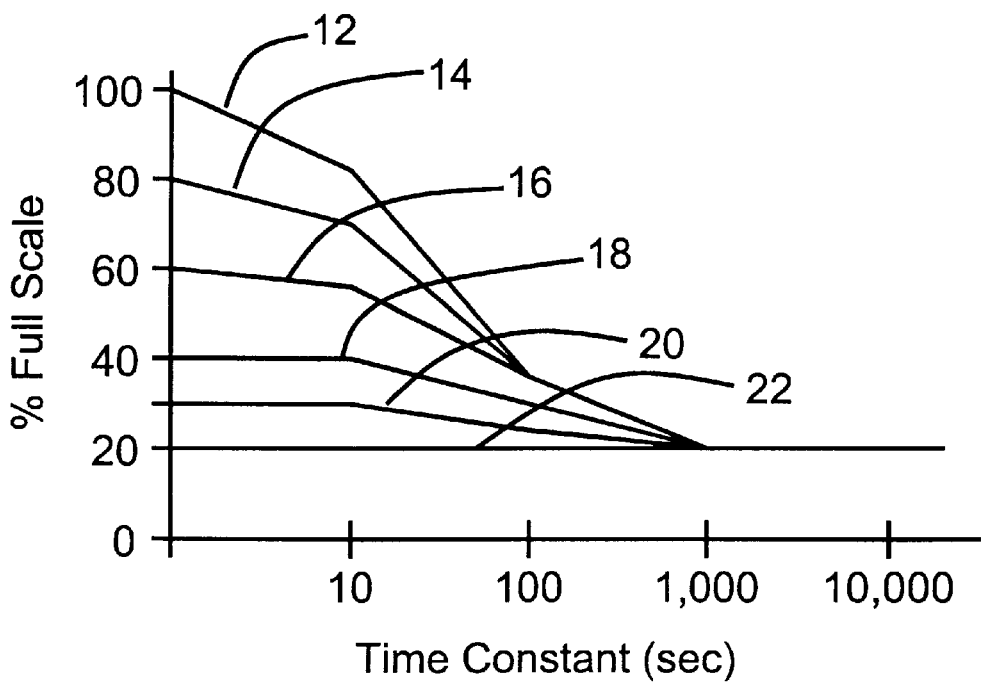
FIG. 2 shows a specification, corresponding to the specification of FIG. 1, showing a series of plots of duty cycles provided by pulse trains corresponding to selected percentages of full load as a function of time constant in seconds.
Figures 3, 10:
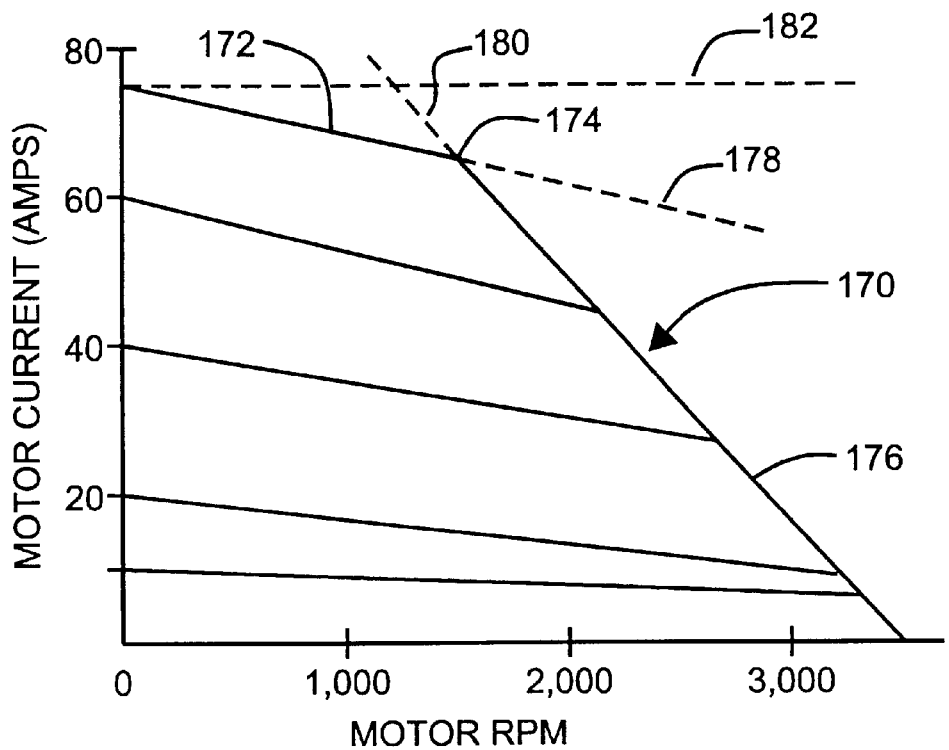
FIG. 3 is a table accompanying the plots of FIG. 2.
FIG. 10 shows plots of actual motor current as a function of motor speed for selected nominal motor current values illustrating the operation of the estimate current block of FIG. 9.

Since curve 10 of FIG. 1 is difficult to apply by itself in designing motor actuated systems, FIG. 2 shows the specification of FIG. 1 approximated by a series of curves 12–22, each of which represents the thermal performance of a pulse train having a duty cycle which thermally limits the system to be within the specification of curve 10 of FIG. 1. In essence, curve 10 of FIG. 1 provides an upper limit to curves 12–22 of FIG. 2. The table of FIG. 3 provides one set of values of pulse train apply time and off time for curves 12–22 of FIG. 2. Generally, the higher the percentage of full load, the shorter the period of application and the longer the recovery period must be to allow sufficient heat dissipation to remain within the specification of FIG. 1

An electric motor actuated system 40 according to the invention is shown in block diagram form in FIG. 5. The specific example shown is a vehicle electric power steering (EPS) system, but the invention is applicable to other electric motor actuated systems, especially those used in vehicles, in which systems see highly varying output loads for greatly differing time periods. A power steering control 42 may comprise a digital electronic computer of standard construction having memory and a digital processor running a stored program embodying a control algorithm. The algorithm reads and processes one or more control input signals and generates an output COMMAND CURRENT, which indicates a desired electric motor current for the desired operation of an electric motor 48. An example of such a power steering control is shown in more detail in U.S. Pat. No. 5,704,446, issued to Chandy et al on Jan. 6, 1998, and other such controls are known in the art.

Signal COMMAND CURRENT, output from power steering control 42, is provided to a thermal limit control 44, which is responsive to a motor load signal. A preferred example of the motor load signal is a motor operating current signal, either measured or estimated, as will be described at a later point in this description. Thermal limit control 44 limits the input signal COMMAND CURRENT as required to derive and output a signal LIMITED COMMAND CURRENT to a motor current control 46 that provides current in response thereto to motor 48. The details of motor current control 46 will depend on the type of motor used as motor 48 and are well known in the art, as is motor 48 itself.

FIG. 6 shows an embodiment of thermal limit control 44. The input motor load signal is, in this embodiment, preferably a motor current signal MOTOR CURRENT, which may be obtained from a motor current sensor, not shown or described herein but of a type well known in the art, coupled to motor 48 so as to sense the operating current therein. Signal MOTOR CURRENT is provided to a determine limit block 50, which processes the signal in a manner described below to provide a MAX CURRENT signal, which may be slew limited in block 52. The lesser of the slew limited MAX CURRENT signal and the signal COMMAND CURRENT is determined in MIN block 54, the output of which is the signal LIMITED COMMAND CURRENT.

Figure 7:
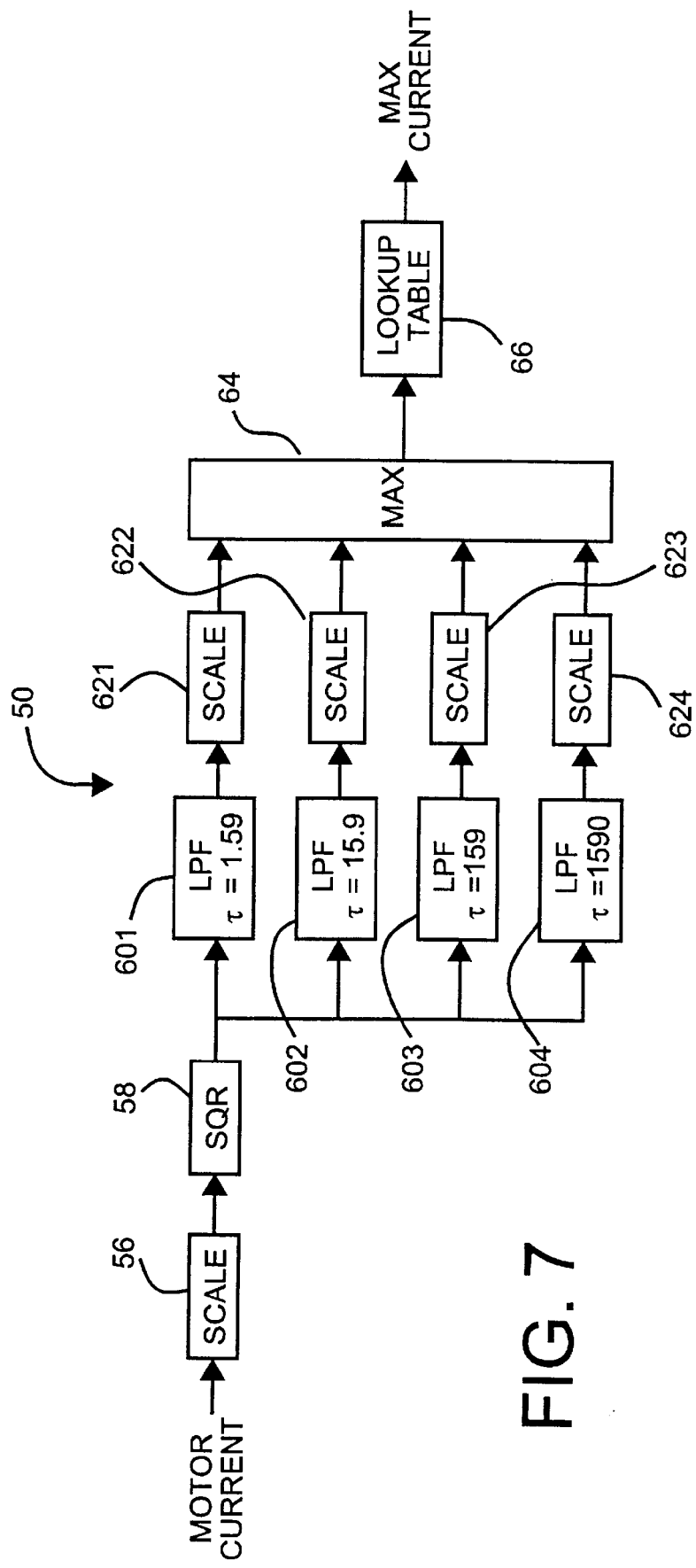
FIG. 7 shows an embodiment of a determine limit control block for use in the thermal limit control of FIG. 6.

Determine limit block 50 is shown in block diagram form in FIG. 7. The input MOTOR CURRENT signal is scaled in scaling amplifier 56 and then squared in square block 58. The scaled and squared value of MOTOR CURRENT is input to a plurality of first order low pass filters (LPF) 601–604. Each of low pass filters 601-604 has a different time constant τ=1.59, 15.9, 159 and 1590 seconds, respectively. The output signals from these low pass filters are scaled in scale blocks 621–624, respectively, so that the target duty cycle, curve 10 of FIG. 1, is associated with 100%. The scaled values are compared in MAX block 64 to determine the maximum of the scaled values; and this maximum is used as an index into a current limit lookup table 66. In this example, table 66 begins to limit when the scaled value equals the square of 92% of the target value and ramps downward to the maximum allowable steady state value when the scaled value equals 100% of the target value, as shown in FIG. 1. By storing squared values in table 66, the step of taking the square root is eliminated, for software simplification and improved processing speed. The output MAX CURRENT represents the present maximum allowable motor current, which is slew limited and provided to MIN block 54 as described above.

In a variation of the embodiment shown, thermal limit control 44 may be provided with a signal from a thermistor, not shown, to degrade to a lower performance limit under extreme temperature conditions. In this variation, the scale factors of scale blocks 621–624, as well as the last value in lookup table 66, are based on the thermistor reading. In addition, the thermistor reading can also be used to provide a rough filter initialization based on temperature when the controller is reset, for example when the vehicle ignition is cycled off and on. Thus, low pass filters 602–604 may be initialized in response to a thermistor reading when the vehicle ignition is turned on. In this embodiment, the time constant of low pass filter 601 is sufficiently short that it decays on its own in the time required to start the vehicle engine. It is thus ready when the vehicle is ready for driving and does not need to be initialized.

FIG. 8 shows an alternate embodiment 144 of the thermal limit control in a system without a motor current sensor. This embodiment is mostly identical to thermal limit control 44, with the function, structure and arrangement of determine limit block 150, slew limit block 152 and MIN block 154 similar to that of like named and similarly numbered blocks 50, 52 and 54. But it differs in the addition of an estimate motor current block 160 that generates an ESTIMATED MOTOR CURRENT signal from feedback signal LIMITED COMMAND CURRENT, as well as the additional signals BATTERY VOLTAGE and MOTOR SPEED. Signal ESTIMATED MOTOR CURRENT is provided to determine limit block 150, in place of the sensed motor current signal used in thermal limit control 44.

Figure 9:
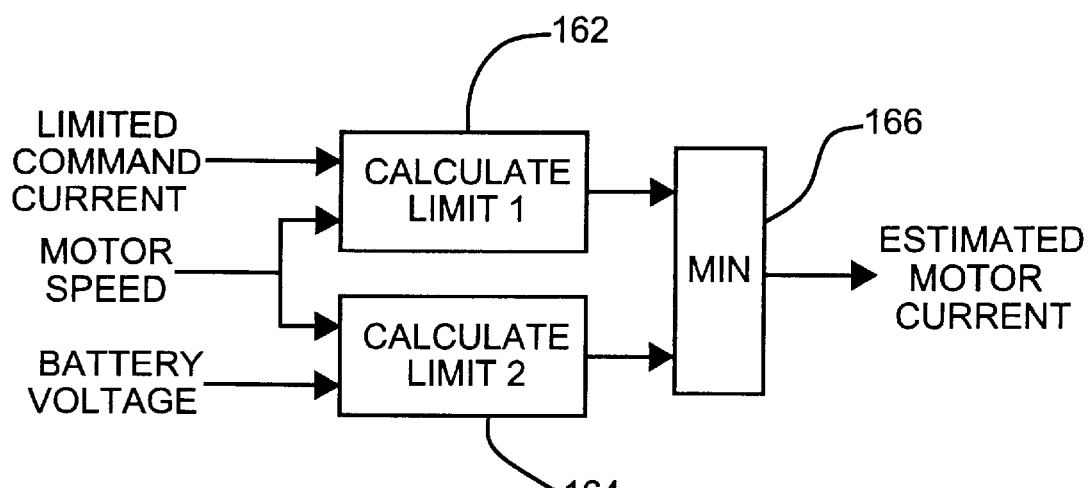
FIG. 9 shows an estimate motor current block for use in the thermal limit control of FIG. 8.

FIG. 9 shows estimate motor current block 160 in greater detail. Input signal MOTOR SPEED is provided, along with signal LIMITED COMMAND CURRENT, to a calculate LIMIT1 block 162. In block 162, LIMIT1 is calculated as a decreasing function of motor speed:

LIMIT1=LIMITED COMMAND CURRENT−(SLOPE1)(MOTOR SPEED)

wherein LIMIT1 is the estimated motor current at speeds below the voltage limit and SLOPE1 is a slope constant in Amps per rad/sec that models inductance/slope compensation effects.

Input signal MOTOR SPEED is also provided, along with signal BATTERY VOLTAGE, to a calculate LIMIT2 block 164. In block 164, LIMIT2 is calculated as a decreasing function of motor speed due to battery voltage limitations:

$$\text{LIMIT2} = (\text{SLOPE2})(\text{MOTOR SPEED} - I_{MOTOR\ SPEED})$$

wherein LIMIT2 is the estimated motor current at speeds above the voltage limit, SLOPE2 is a slope constant in Amps per rad/sec that models voltage limit effects and $I_{MOTOR\ SPEED}$, which is stored as a function of BATTERY VOLTAGE, is the intercept on the motor speed axis. The outputs LIMIT1 and LIMIT2 are provided to MIN block 166, which outputs the lesser as signal ESTIMATED MOTOR CURRENT.

The operation of motor current block 160 can be more clearly understood with reference to FIG. 10, which shows approximate plots of actual motor current as a function of motor speed for selected nominal motor current values. Plot 170 represents actual motor current for a nominal full rated current of 75 amps (the nominal current variance with motor speed being represented by dashed line 182. In contrast with curve 182, plot 170 of the actual motor current varying with motor speed has a portion 172 beginning with a current value of 75 amps at 0 RPM motor speed and sloping gently downward with increasing motor speed until it reaches a voltage limit at point 174. Plot 170 then continues down portion 176 along the voltage limit at a greater slope until it intercepts the horizontal (motor speed) axis. The LIMIT1 equation describes portion 172 of plot 170 (and continues with dashed line 178 extending to the right of point 174). The LIMIT2 equation describes portion 176 (and extends upward with dashed line 180). Selection of the minimum of LIMIT1 and LIMIT2 ensures that the estimate of current will be limited by curve 170.

In the operation of this invention, it is strongly preferred that the value of motor current used as the motor load signal be the limited value (that is, the value as limited by this system and also by any other current limiting being done). This will allow the low pass filters to decay if possible due to the limiting of this invention and prevent unnecessary limiting. If the motor load signal is a sensed motor current signal, this will generally be automatically true. If an estimated motor current signal is used, it is important that it be based on the limited current signal, as shown with the feedback of the LIMITED COMMAND CURRENT signal to estimate motor current block 160 in FIG. 8, rather than the (unlimited) COMMAND CURRENT signal output of power steering control 42.

What is claimed is:

1. A method of controlling current in an actuating motor operating over varying loads for varying time periods, comprising the steps:

generating a motor load signal;

separately low pass filtering the motor load signal with a plurality of different time constants spanning a range of expected motor operation to generate a plurality of filtered motor load signals each associated with one of the time constants;

comparing each of the filtered motor load signals with a predetermined reference value corresponding to the associated time constant;

if one or more of the filtered motor load signals exceeds the predetermined reference value with which it is compared, selecting the one that so exceeds by the greatest margin and deriving therefrom a motor current limit factor; and limiting motor operating current in response to the motor current limit factor.

2. The method of claim 1 in which the motor load signal is indicative of the limited motor operating current.

3. The method of claim 2 in which the motor load signal is derived from sensed motor operating current.

4. The method of claim 2 further comprising the steps:

generating a command current signal;

applying the motor current limit factor to the command current signal to create a limited command current signal;

using the limited command current signal to determine motor operating current; and deriving the motor load signal from the limited command current signal.

5. The method of claim 1 in which the predetermined reference value for each associated time constant corresponds to a predetermined percent of full rated motor load, the method further comprising the steps:

storing data relating values of the current limit factor to values of the filtered motor load signal in excess of the predetermined reference value; and deriving the current limit factor from the stored data.

6. An operating current limiting control for a motor subject to varying motor loads for varying time periods comprising, in combination:

a generator of a motor load signal;

a plurality of low pass filters having a plurality of different time constants spanning a range of expected motor operation;

means for providing the motor load signal to each of the low pass filters;

means for comparing filtered motor load signals from each of the low pass filters with a predetermined reference value corresponding to the associated time constant;

means for determining if any of the filtered motor load signals exceeds the predetermined reference value with which it is compared and, if more than one is determined, selecting one of those determined that so exceeds by the greatest margin;

means for deriving from the selected filtered motor load signal a motor current limit factor; and means for limiting motor operating current in response to the motor current limit factor.

7. The operating current limiting control of claim 6 in which the generator of the motor load signal is a current sensor responsive to the operating current of the motor.

8. The operating current limiting control of claim 6 in which the means for limiting motor operating current generates a limited command current signal for the control of motor operating current and the generator of the motor load signal comprises, in combination:

means for generating a motor speed signal;

means for generating an operating voltage signal;

data storage means comprising first stored data that models a decrease in motor operating current with increasing motor speed due to inductance/slope compensation effects and second stored data that models a decrease in motor operating current with increasing motor speed due to voltage limit effects;

means responsive to the motor speed signal, the limited command current signal and the first stored data for deriving an inductance/slope compensation effects limited current value;

means responsive to the operating voltage signal, the limited command current signal and the second stored data for deriving a voltage limited current value; and means for selecting the lesser of the inductance/slope compensation effects limited current value and the voltage limited current value as the motor load signal.

* * * * *